United States Patent Office 3,188,851
Patented June 15, 1965

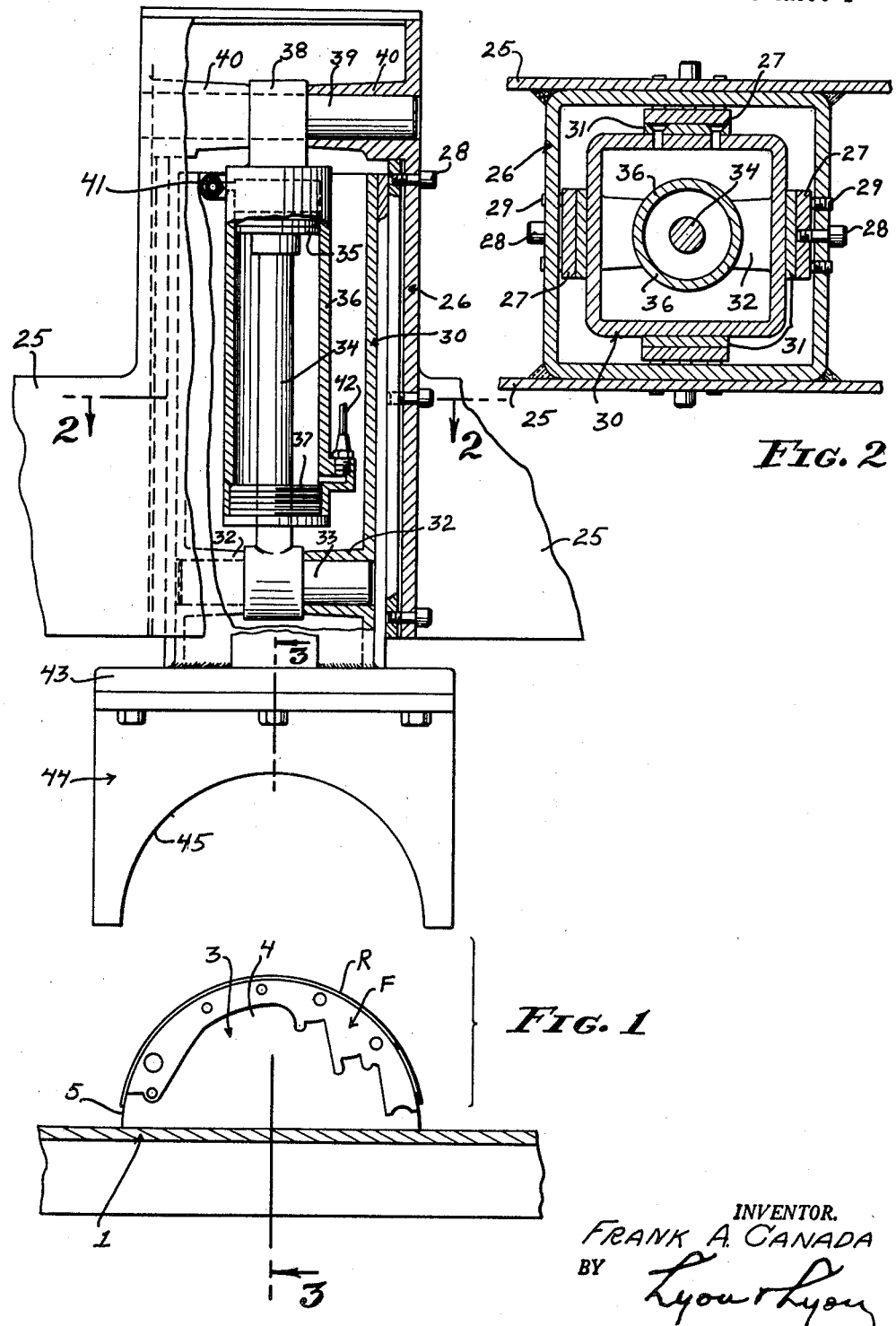

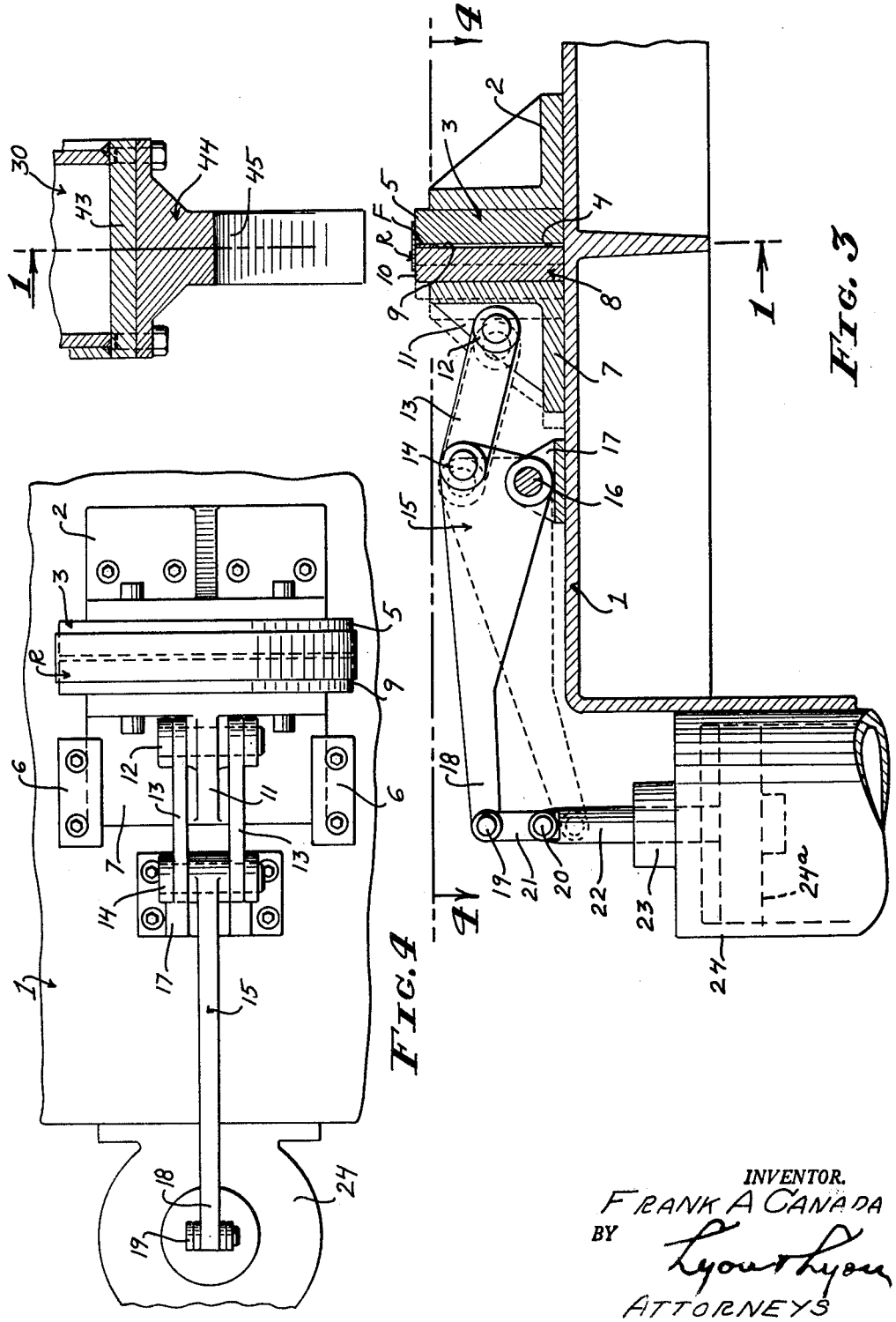

3,188,851
BRAKE SHOE TRUING MACHINE
Frank A. Canada, 140½ S. Montebello Blvd.,
Montebello, Calif.
Filed Sept. 11, 1961, Ser. No. 137,394
2 Claims. (Cl. 72—415)

This invention relates to brake shoe truing machines. The conventional brake shoe such as used on motor vehicles comprises an arcuate rim and a radial flange joined to the rim by welding. Both of these members are usually formed of sheet metal by stamping. It is now conventional practice to cement the brake lining to the rim member of the brake shoe. When it is necessary to replace the brake lining the remaining portion of the previous lining must be removed. This may be done by grinding. Also, it is customary to burn off the old cement, and also to sandblast the surfaces. In doing so, the brake shoe may be mechanically damaged, or due to heating, the brake shoe may be warped. Warping may also occur in the use of the brake shoe.

A primary object of this invention is to provide a brake shoe truing machine wherein both the flange and rim of the brake shoe are forceably engaged by dies to restore the brake shoe to its initial or correct shape.

A further object is to provide a brake shoe truing machine wherein the flange of the brake shoe is first clamped and straightened between two dies which also have arcuate or convex die surfaces defining the true curvature of the radially inner side of the brake shoe rim; whereupon a mating concave die defining the outer side of the brake shoe rim engages the rim to straighten the rim while the flange is held in its straightened condition.

A still further object is to provide a brake shoe truing machine which may be operated rapidly so that the expense of the truing operation is minimized and wherein the truing dies may be readily changed to accommodate different types and sizes of brake shoes.

With the above and other objects in view as may appear hereinafter reference is directed to the accompanying drawings, in which:

FIGURE 1 is a fragmentary sectional view of the brake truing machine taken substantially through 1—1 of FIGURE 3 with portions shown in elevation.

FIGURE 2 is a fragmentary transverse sectional view taken through 2—2 of FIGURE 1.

FIGURE 3 is a fragmentary sectional view taken through 3—3 of FIGURE 1.

FIGURE 4 is a fragmentary plan view taken along the line 4—4 of FIGURE 3.

The brake shoe truing machine includes a bed structure 1 on which is secured a fixed bracket 2. The fixed bracket 2 includes a perpendicular face to which is secured a fixed convex die 3. The die 3 is in the form of a semi-circle. One axial end forms a flange-engaging surface 4, whereas its curved edge forms a rim-engaging surface 5. Slidably mounted between guide members 6 is a movable bracket 7 also having a perpendicular side to which is secured a movable convex die 8 which is identical in size and shape to the fixed convex die 3 having at one axial end a flange-engaging surface 9, and its curved edge forming a rim-engaging surface 10. The flange-engaging surfaces 4 and 9 are parallel to each other and the rim-engaging surfaces 5 and 10 define a common arc, that is, they coincide.

The movable bracket 7 is provided with a web 11 which is connected by journal pin 12 to a pair of link members 13. The link members, in turn, are connected by a journal pin 14 to one apex of an essentially triangular lever 15. The triangular lever has a short side which forms a short lever arm connected by a fulcrum pin 16 to a fulcrum bracket 17 secured to the bed structure 1. The long dimension of the lever 15 forms an extended lever arm 18 which is connected by fulcrum pins 19 and 20 and links 21 to a piston rod 22. The piston rod extends through a packing gland 23 at one end of a cylinder 24 and is attached to a piston 24a.

The extended lever arm 18 of the lever 15 occupies substantially a horizontal position and the piston rod and cylinder occupy a vertical position. The cylinder 24 is secured to a vertical side of the bed structure 1.

Suitably supported above the bed structure 1 is a frame structure 25. The frame structure 25 supports a sleeve 26 which is preferably square in cross section and positioned with its longitudinal axis above the fixed and movable convex dies 3 and 8. Each of the walls of the sleeve 26 is provided with adjustable guide ways 27 supported by set screws 28 and 29 so arranged that each guide ways may be moved to and from the wall of the sleeve a limited distance.

Mounted within the sleeve 26 is a tubular ram 30 of square cross section. Wear pads 31 are provided on the four sides of the ram for sliding engagement with the guide ways 27. The lower end of the ram 30 is provided internally with a pair of axially aligned bearing bosses 32 defining a transverse axis. The bosses 32 receive a connecting pin 33. Mounted on the connecting pin between the bosses 32 is a piston rod 34 which extends upwardly within the ram 30 and joins to a piston 35. The piston 35 is fitted within a cylinder 36 which surrounds the piston rod 34 and is provided with a packing gland 37 at its lower end. The upper end of the cylinder 36 is provided with a supporting lug 38 which receives a transversely extending connecting pin 39. Extending inwardly from opposite sides of the sleeve 26, near its upper end, are aligned bosses 40 which receive the ends of the connecting pin 39. Pressure fluid is adapted to be supplied to the ends of the cylinder 36 through fittings 41 and 42.

The lower end of the ram 30 is provided with a mounting flange 43 to the underside of which is secured a concave die 44 having a concave die surface 45. By reason of the adjustment afforded by the set screws 28 and 29, the concave die 44 may be so adjusted as to register the convex dies 3 and 8.

Operation of the brake shoe truing machine is as follows: The brake shoe for which the machine is adapted comprises a semi-circular rim R to which is attached an internal flange F. Both of these members are formed by stamping and often have internal stresses which when the rim and flange are heated substantially may cause the brake shoe to warp. Such excess heating may occur in the use of the brake shoe; also, the brake shoe must be heated substantially in the course of preparing the brake shoe for a new lining. In this regard, it should be noted that the practice of cementing the brake lining to the brake shoe is virtually standard. The old brake shoe is usually ground off and then the brake shoe is heated to burn off the cement. This operation is followed by a sandblasting treatment. In the course of these operations, the brake shoe may be mechanically distorted or by reason of the heat applied may become warped.

In order to straighten or true the brake shoe, the flange F is inserted between the flange-engaging surfaces 4 and 9 of the convex dies 3 and 8, whereupon the cylinder 24 is activated to force the movable convex die against the fixed convex die. By reason of the leverage afforded by the lever 15, the movable die is forced against the flange with a substantial impact. After operation of the cylinder 24, the cylinder 36 is operated to drive the ram 30 and concave die 44 downwardly against the outer surface of the rim R of the brake shoe. It will be noted that the concave die has a relatively long travel therefore it engages the rim R with a substantial impact. The curvatures of the convex dies and concave die are so mated that the rim is forced to its true contour.

The substantial clearance between the concave and convex dies, when the concave die is raised, as shown in FIGURES 1 and 3 facilitate insertion and removal of the brake shoe.

Having fully described my invention, it is to be understood that I do not wish to be limited to the details herein set forth or to the details illustrated in the drawings, but my invention is of the full scope of the appended claims.

I claim:

1. A truing machine for a brake shoe having a semicircular rim and an internal flange secured to the rim along its median line, said machine, comprising: a bed structure; a frame structure disposed above said bed structure; a guide sleeve carried by said frame structure and defining an axis perpendicular to said bed structure; a tubular arm reciprocably and non-rotatably mounted in said guide sleeve; a piston and cylinder means within said sleeve and ram for driving said ram toward said bed structure; a concave die carried by said ram for engagement with the radially outer side of the rim of said brake shoe; a fixed convex die secured to said bed structure under said concave die and having a curved die surface for engagement with the inner side of the rim of said brake shoe at one side of said flange, and a flat die surface for engagement with said one side of the flange; a movable convex die slidable on said bed structure at right angles to said concave die and having a curved die surface for engagement with the inner side of the rim of said brake shoe at the other side of said flange and a flat die surface for engaging said other side of the flange; and means for forcing said movable convex die against the fixed convex die to engage and flatten said flange, said concave die movable by said ram to cooperate with said convex dies to reform the rim of said brake shoe.

2. A truing machine for a brake shoe having a semicircular rim and an internal flange secured to said rim along its median line, said machine, comprising: a bed structure; a frame structure disposed above said bed structure; a guide sleeve of essentially rectangular cross section carried by said frame structure and defining an axis perpendicular to said bed structure; guide ways disposed along each wall of said guide sleeve; a tubular ram of essentially rectangular cross section disposed in said sleeve; guide ways on said ram for sliding engagement with the guide ways in said sleeve, said guide ways restraining said ram against rotation; a head for said ram; a concave die carried by said head for forceable engagement with the rim of said brake shoe; a piston and cylinder means within said tubular ram one end thereof being secured to said ram adjacent said head the other end being secured within said sleeve beyond said ram; a fixed convex die secured to said bed structure under said concave die and having a curved die surface for engagement with the inner side of the rim of said brake shoe at one side of said flange, and a flat die surface for engagement with said one side of the flange; a movable convex die slidable on said bed structure at right angles to said concave die and having a curved die surface for engagement with the inner side of the rim of said brake shoe at the other side of said flange and a flat die surface for engaging said other side of the flange; and means for forcing said movable convex die against the fixed convex die to engage and flatten said flange, said concave die movable by said ram to cooperate with said convex dies to reform the rim of said brake shoe.

References Cited by the Examiner
UNITED STATES PATENTS

| 1,418,026 | 5/22 | Schmidt et al. | 153—48 |
| 2,515,841 | 7/50 | Stuart | 153—34 |
| 2,523,527 | 9/50 | Steder | 153—48 |
| 2,999,527 | 9/61 | Klavon | 153—34 |

CHARLES W. LANHAM, *Primary Examiner.*